US009046677B2

(12) United States Patent
Tamura

(10) Patent No.: US 9,046,677 B2
(45) Date of Patent: Jun. 2, 2015

(54) MICROSCOPE SYSTEM AND AUTOFOCUS METHOD

(71) Applicant: OLYMPUS CORPORATION, Shibuya-ku, Tokyo (JP)

(72) Inventor: Yosuke Tamura, Kawaguchi (JP)

(73) Assignee: OLYMPUS CORPORATION, Tokyo (JP)

( * ) Notice: Subject to any disclaimer, the term of this patent is extended or adjusted under 35 U.S.C. 154(b) by 223 days.

(21) Appl. No.: 13/723,386

(22) Filed: Dec. 21, 2012

(65) Prior Publication Data

US 2013/0176617 A1 Jul. 11, 2013

(30) Foreign Application Priority Data

Jan. 11, 2012 (JP) .................................. 2012-002812

(51) Int. Cl.
  *G02B 21/00* (2006.01)
  *G02B 21/24* (2006.01)
(52) U.S. Cl.
  CPC .............. *G02B 21/00* (2013.01); *G02B 21/244* (2013.01)
(58) Field of Classification Search
  CPC .............................. G02B 21/00; G02B 21/244
  USPC ....................................................... 359/383
  See application file for complete search history.

(56) References Cited

U.S. PATENT DOCUMENTS

| 6,259,080 | B1 * | 7/2001 | Li et al. ....................... 250/201.3 |
| 7,109,459 | B2 * | 9/2006 | Kam et al. ................... 250/201.4 |
| 7,518,652 | B2 * | 4/2009 | Olson et al. .................... 348/351 |
| 8,576,483 | B2 * | 11/2013 | Tanabe et al. .................. 359/383 |
| 8,786,693 | B2 * | 7/2014 | Kihara et al. ..................... 348/79 |
| 2005/0105174 | A1 * | 5/2005 | Ogihara et al. ................ 359/383 |
| 2008/0123185 | A1 * | 5/2008 | Yoneyama et al. ............ 359/383 |
| 2010/0172020 | A1 * | 7/2010 | Price et al. ..................... 359/381 |

FOREIGN PATENT DOCUMENTS

JP  10-197784 A  7/1998

* cited by examiner

*Primary Examiner* — Frank Font
(74) *Attorney, Agent, or Firm* — Holtz, Holtz, Goodman & Chick PC

(57) ABSTRACT

A microscope system and an autofocus method capture a subject at a specified time interval through an optical image forming system while relatively moving a stage loaded with the subject and the optical image forming system of the microscope; calculate a contrast value indicating a high and low contrast of a captured observation image; detect a maximum contrast image whose calculated contrast value is maximum in a plurality of performed observation images; detect the relative position of the stage and the optical image forming system; perform a correcting process of moving the detected relative position corresponding to the detected maximum contrast image by a specified value in a direction opposite the direction of the relative movement; and bring focus using the corrected relative position as a focal point.

11 Claims, 15 Drawing Sheets

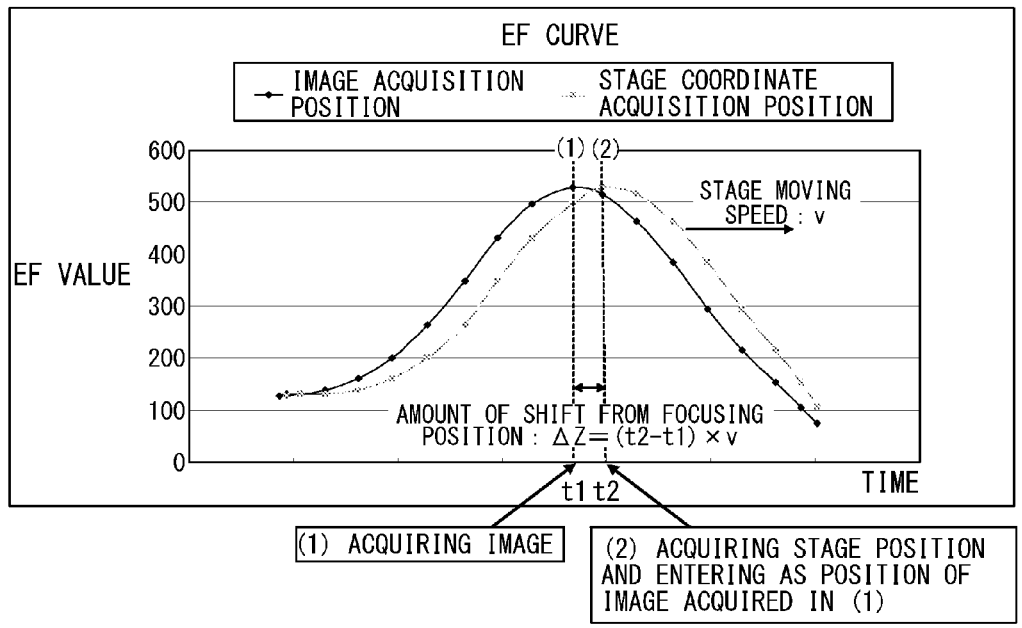
F I G. 2A

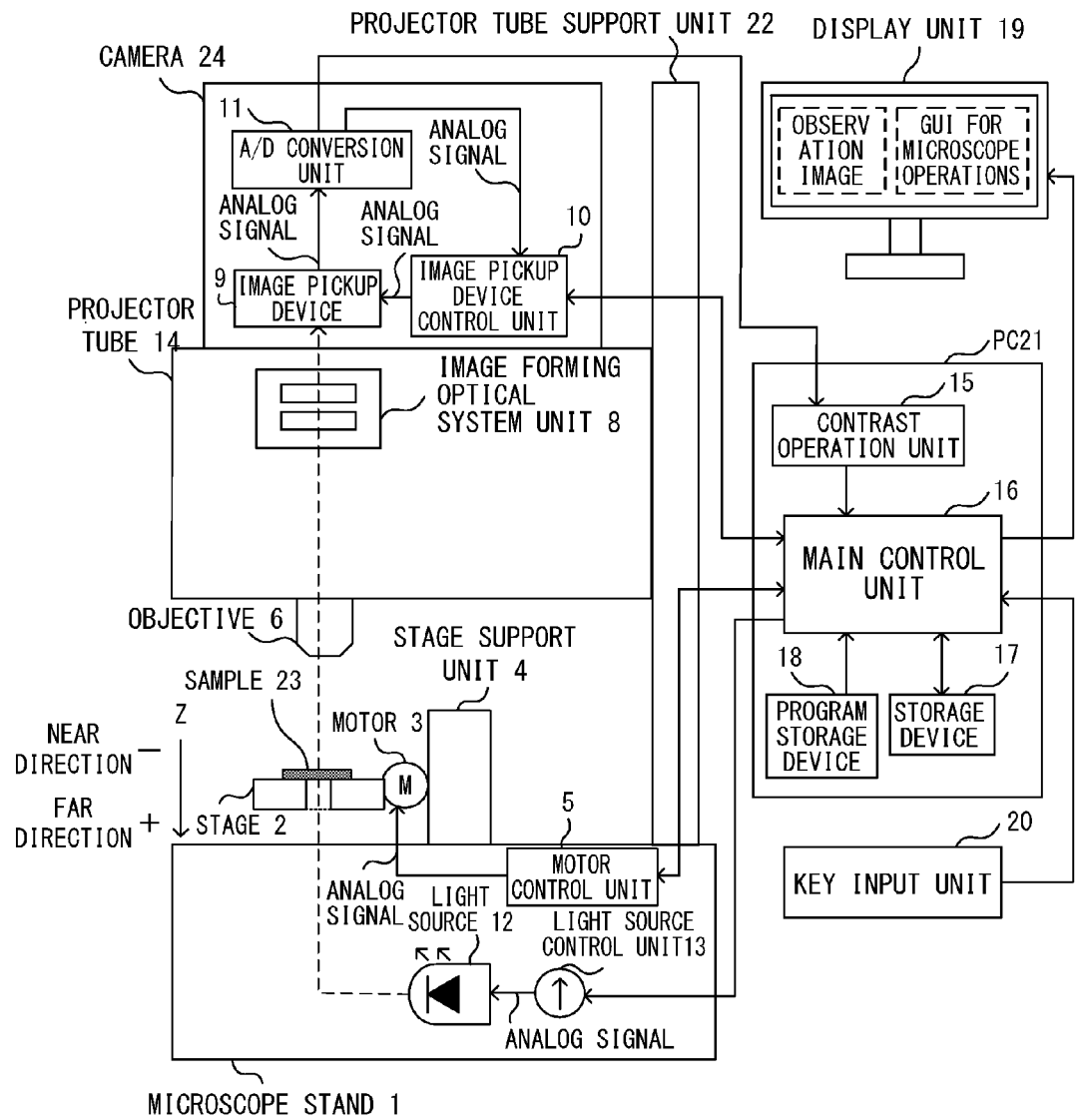
F I G. 10

MICROSCOPE SYSTEM AND AUTOFOCUS METHOD

CROSS-REFERENCE TO RELATED APPLICATIONS

This application is based upon and claims the benefit of priority of the prior Japanese Patent Application No. 2012-002812, filed on Jan. 11, 2012, the entire contents of which are incorporated herein by reference.

FIELD

The present invention is related to a microscope system provided with an autofocus (AF) function, and more specifically to a microscope system and an autofocus method for which an electric unit whose focusing unit such as a stage etc. moves vertically and horizontally under electric control is provided, and an autofocus function of determining a focal position from a result of a contrast operation of an image captured by an image pickup device is provided.

BACKGROUND

Conventionally, an image pickup apparatus such as a digital still camera, an electronic camera, etc. for capturing a subject image formed by an optical imaging system such as an image pickup lens etc. using a solid-state image pickup device configured by a CCD (charge coupled device) etc., and recording the specified subject image with a value of the brightness of an image as image data such as digital data etc. in a recording medium has become widespread. A number of such image pickup apparatuses are used by connection to a microscope to capture a microscopic status of a living organization, a cell, etc. for uses other than generally capturing a landscape, a person, etc. as a subject.

Furthermore, many recent microscopes are used in a method of implementing an autofocus (AF) mechanism using a digital camera, and observing an image captured by the digital camera on a display unit.

In the AF using a digital camera having an image pickup device such as a CCD etc., a method of performing a contrast operation by comparison with adjacent pixels and defining the position where the contrast operation value indicates the maximum value as a focusing position has been put to practical use, and has been well known as contrast AF.

In the contrast AF in the microscopic observation, widely used practically is a method in which an image is captured by changing the position of a focusing unit (hereafter referred to as a Z position) such as a stage etc. which moves vertically by electric control, then Z position information is acquired from a control unit such as a CPU (central processing unit) etc., the Z position information is entered as the position information about the image, and a focusing position where the contrast value indicates the maximum value is searched for from a result of the contrast operation.

For example, disclosed is the technology capable of capturing an image of a subject formed through an optical microscope and an optical system for forming images of a camera device through an image pickup device such as a CCD camera etc., capturing a video signal with specified timing while moving the stage of the optical microscope, detecting a high-frequency component of the signal, and calculating the contrast of the video signal (for example, the patent document 1).

In the contrast AF disclosed in the patent document 1 above, a stage is to be moved slowly in a wide range to search the focusing position with high accuracy in one scan. Therefore, the AF time is long. Accordingly, the patent document 1 describes the devise to realize a high AF speed by performing the AF processing by two scanning operations, that is, a rough focus operation performed at a high stage speed (hereafter referred to as a rough scan) and a fine focus operation performed at a low stage speed (hereafter referred to as a fine scan). That is, a focusing position is roughly detected by the rough scan, and then a precise focusing position is detected by the fine scan.

The AF sequence of two scanning operations of the patent document 1 is described below. It is assumed that the stage moving direction in the AF sequence is the near direction as a direction in which the stage approaches the objective, and the far direction as a direction in which the stage moves away from the objective.

FIG. 1A is an explanatory view of the AF sequence accompanied by the conventional stage stop.

(1) When the AF is started, the stage is moved to the nearside by a specified distance Wstart(m) from the Z position where the AF is started.

(2) When the movement is made by the specified distance Wstart(m), the rough scan is started, and the stage is moved to the far side by a specified scanning range Wrough(m). In the meantime, a still image is acquired with the stage moved at a specified sampling pitch. Then, a contrast operation is performed on the acquired image, the Z coordinate of the stage is read, and the Z coordinate is entered as the acquisition position of the image (the point indicated by the triangles in FIG. 1A).

(3) When the movement is made by the specified scanning range Wrough(m), the rough scan is terminated, the stage is moved to the near side by the specified distance Wback(m), and the stage is moved to the starting position of the fine scan.

(4) When the movement is made by the specified distance Wback(m), the fine scan is started, and the stage is moved to the far side by the specified scanning range Wfine(m). In the meantime, an image is acquired and the contrast operation is performed with the stage moved at a specified sampling pitch. Then, the Z coordinate of the stage is read after acquiring the image, and the Z coordinate is entered as the acquisition position of the image (the point indicated by the dots in FIG. 1A). The sampling pitch of the fine scan is shorter than the sampling pitch of the rough scan.

(5) When the movement is made by the specified scanning range Wfine(m), the stage is moved to the Z coordinate (contrast peak coordinate) where the contrast values detected by the processes (2) and (4) above are the maximum.

(6) When the movement to the contrast peak coordinate is made, the AF processing is terminated.

As described above, in the conventional contrast AF (hereafter referred to as AF), an image is captured with the stage stopped to acquire the image, and then the Z position information is acquired.

Then, to perform the AF processing at a high speed, capturing an image without stopping the stage is considered when the image is acquired. This method is applied to the AF sequence above as follows.

FIG. 1B is an explanatory view of the AF sequence not accompanied by the conventional stage stop.

(1) As with the case in FIG. 1A, when the AF is started, the stage is moved to the near side by the specified distance Wstart(m).

(2) When the movement is made by the specified distance Wstart(m), the rough scan is started, an image is captured with the stage moved to the far side by the specified scanning range Wrough(m), and the contrast operation is performed on the acquired image. At this point, the Z coordinate of the stage is read after the image is acquired, and the Z coordinate is entered as the acquisition position of the image (the point indicated by the triangles in FIG. 1B).

Since there is a time difference between the acquisition of the image and the acquisition of the coordinate of the stage, the Z position information about the image is shifted from the practical position where the image is acquired by the value obtained by multiplying the time difference by the stage speed. The broken line in FIG. 1B indicates the practical position where the image is acquired.

(3) When the movement is made by the specified scanning range Wrough(m), the rough scan is terminated, the stage is moved to the near side by the specified distance Wback(m), and the stage is moved to the starting position of the fine scan.

At this point, the fine scan may be started from the point beyond the contrast peak position detected by the rough scan. However, when the shift from the practical position where the image is acquired is large, the starting point of the fine scan is marked before the practical position of the contrast peak.

(4) When the movement is made by the specified distance Wback(m), the fine scan is started, an image is captured with the stage moved to the far side by the specified scanning range Wfine(m), and the contrast operation is performed on the acquired image. At this point, the Z coordinate of the stage is read after the image is acquired, and the Z coordinate is entered as the acquisition position of the image (the point indicated by the dots in FIG. 1B).

(5) When the movement is made by the specified scanning range Wfine(m), the stage is moved to the Z coordinate (contrast peak coordinate) where the contrast value detected in the process (4) above indicates the maximum value.

In the case in FIG. 1B, since the point where the contrast value is lower than the practical focusing position is the contrast peak coordinate, the final AF termination position is a false focusing position.

(6) The movement to the false focusing position is made, and the AF processing terminates.

Patent Document 1: Japanese Laid-open Patent Publication No. 10-197784

SUMMARY

According to an aspect of the microscope system of the present invention, a microscope system which brings an observation image into focus in a microscope includes: an image pickup unit which captures a subject at a specified time interval through an optical image forming system while relatively moving a stage loaded with the subject and the optical image forming system of the microscope; a contrast value calculation unit which calculates a contrast value indicating a high and low contrast of a captured observation image; a maximum contrast image detection unit which detects a maximum contrast image whose calculated contrast value is maximum in a plurality of performed observation images; a relative position detection unit which detects the relative position of the stage and the optical image forming system; a position correction unit which performs a correcting process of moving the detected relative position corresponding to the detected maximum contrast image by a specified value in a direction opposite the direction of the relative movement; and an autofocus unit which brings focus using the corrected relative position as a focal point.

BRIEF DESCRIPTION OF DRAWINGS

FIG. 2A is an explanatory view for explanation of a shift of a focusing position;

FIG. 10 is an example of a configuration of the microscope system having an AF mechanism according to another variation example 1 of the present invention;

DESCRIPTION OF EMBODIMENTS

Figure 1A:
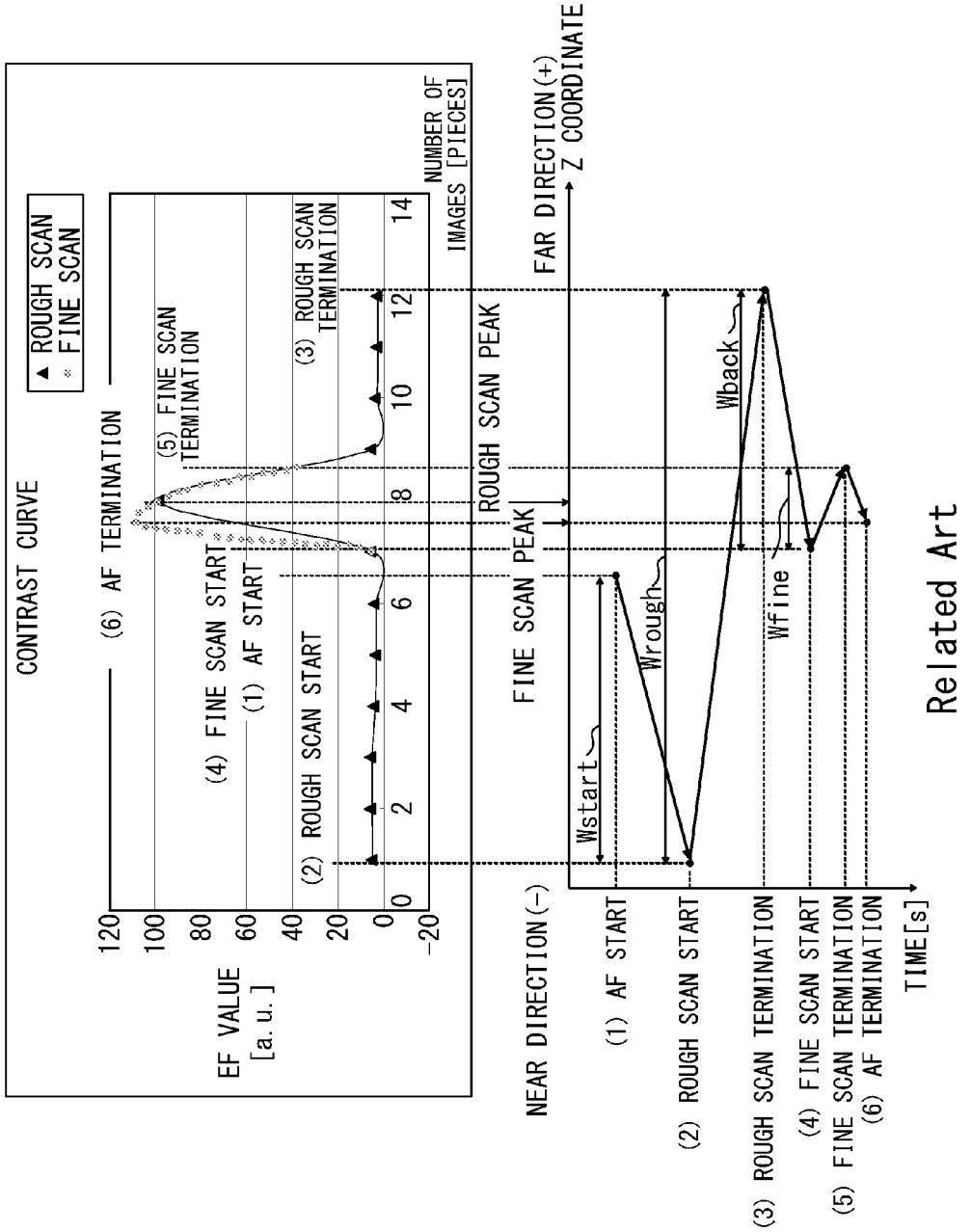
FIG. 1A is an explanatory view of an AF sequence accompanied by a conventional stage stop.
Figure 1:
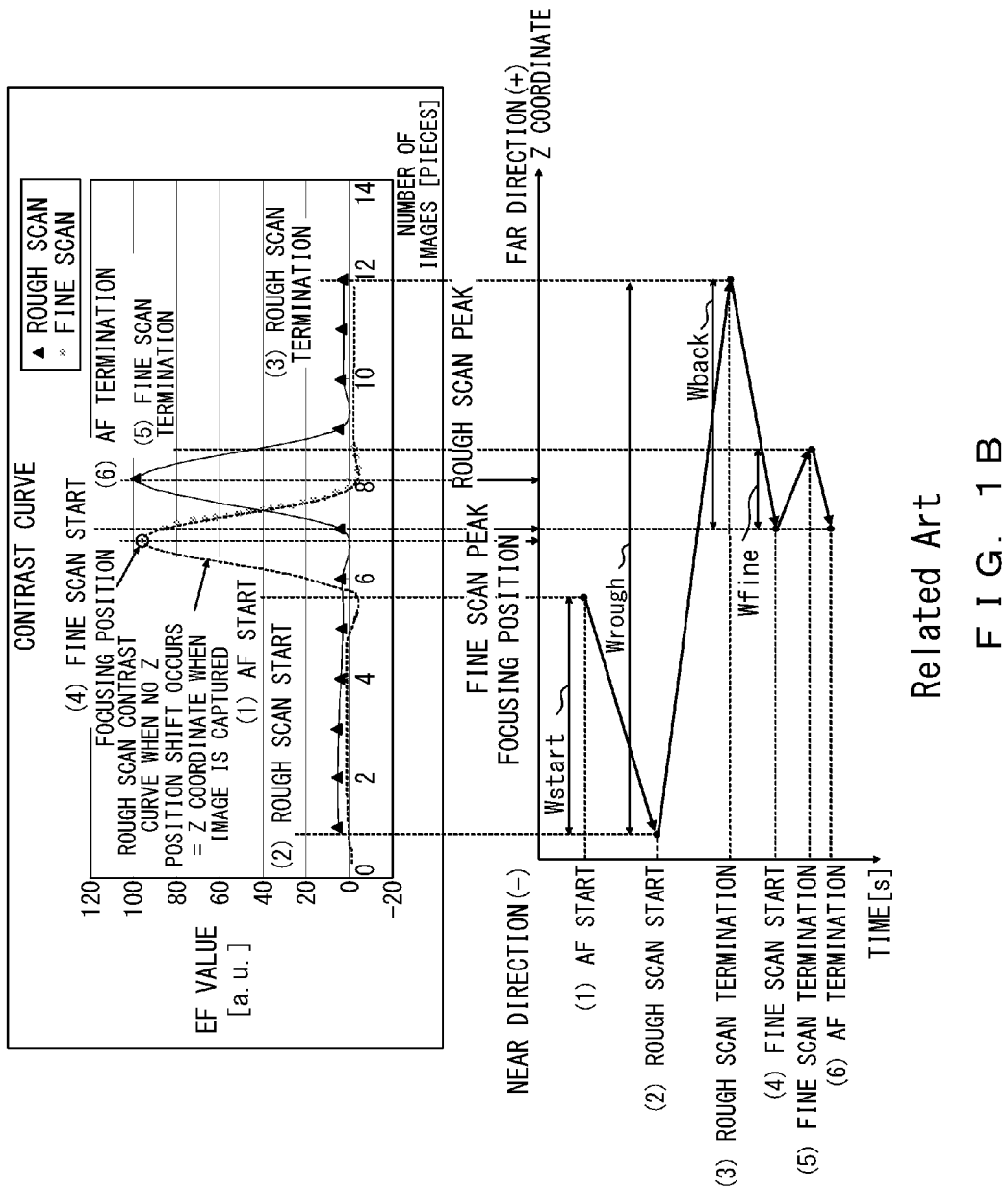
FIG. 1B is an explanatory view of an AF sequence not accompanied by a conventional stage stop.

The present invention has been developed to solve the above-mentioned problems, and aims at providing a microscope system provided with an autofocus function and an autofocus method capable of correctly determining a focusing position by AF while moving a focusing unit such as a stage etc.

To solve the above-mentioned problems, the present invention has the following configuration.

That is, according to an aspect of the present invention, the microscope system of the present invention brings an observation image on a microscope into focus, and includes: an image pickup unit which captures a subject at a specified time interval through an optical image forming system while relatively moving a stage loaded with the subject and the optical image forming system of the microscope; a contrast value calculation unit which calculates a contrast value indicating a high and low contrast of a captured observation image; a maximum contrast image detection unit which detects a maximum contrast image whose calculated contrast value is maximum in a plurality of performed observation images; a relative position detection unit which detects the relative position of the stage and the optical image forming system; a position correction unit which performs a correcting process of moving the detected relative position corresponding to the detected maximum contrast image by a specified value in a direction opposite the direction of the relative movement; and an autofocus unit which brings focus using the corrected relative position as a focal point.

It is further preferable that the microscope system according to the present invention further includes a relative position detection unit which calculates the relative speed of the stage and the optical image forming system, and the position correction unit moves the detected relative position corresponding to the detected maximum contrast image by the value obtained by multiplying the difference between the capture time of the observation image and the acquisition time of the acquired relative position by the relative speed.

It is also preferable that, in the microscope system according to the present invention, the image pickup unit further includes: a rough scan unit which captures an image at a first time interval and a fine scan unit which captures an image at a second time interval, the maximum contrast image detection unit detects a first maximum contrast image using an observation image captured by the rough scan unit, and a second maximum contrast image is detected using the observation image captured by the fine scan unit in a specified range including the detected relative position corresponding to the detected first maximum contrast image.

In addition, according to another aspect of the present invention, it is preferable that a non-temporary medium of the present invention stores an autofocus program for bringing an observation image into focus on a microscope and directing a computer to perform the functions of: capturing a subject at a specified time interval through an optical image forming system while relatively moving a stage loaded with the subject and the optical image forming system of the microscope; calculating a contrast value indicating a high and low contrast of a captured observation image; detecting a maximum contrast image whose calculated contrast value is maximum in a plurality of performed observation images; detecting the relative position of the stage and the optical image forming system; performing a correcting process of moving the detected relative position corresponding to the detected maximum contrast image by a specified value in a direction opposite the direction of the relative movement; and bringing focus using the corrected relative position as a focal point.

Furthermore, it is also preferable that the non-temporary medium according to the present invention is used to direct a computer to further perform the function of calculating the relative speed of the stage and the optical image forming system, and the position correcting function moves the detected relative position corresponding to the detected maximum contrast image by the value obtained by multiplying the difference between the capture time of the observation image and the acquisition time of the acquired relative position by the relative speed.

It is also preferable that, in the non-temporary medium according to the present invention, the capturing function includes a rough scan function which captures an image at a first time interval and a fine scan function which captures an image at a second time interval, the maximum contrast image detecting function detects a first maximum contrast image using an observation image captured by the rough scan function, and a second maximum contrast image is detected using the observation image captured by the fine scan function in a specified range including the detected relative position corresponding to the detected first maximum contrast image.

Furthermore, according to a further aspect of the present invention, the autofocus method of the present invention is used to direct a processor to bring an observation image on a microscope into focus for: capturing a subject at a specified time interval through an optical image forming system while relatively moving a stage loaded with the subject and the optical image forming system of the microscope; calculating a contrast value indicating a high and low contrast of a captured observation image; detecting a maximum contrast image whose calculated contrast value is maximum in a plurality of performed observation images; detecting the relative position of the stage and the optical image forming system; performing a correcting process of moving the detected relative position corresponding to the detected maximum contrast image by a specified value in a direction opposite the direction of the relative movement; and bringing focus using the corrected relative position as a focal point.

The embodiments of the present invention are described below in detail with reference to the attached drawings.

As described above, the AF is to be performed at a high speed without stopping the stage. In this case, however, Z position information is acquired after receiving a capture termination signal. As a result, the Z position information entered on the image is shifted by a movement of the stage while the Z position information is acquired from the point when the image is acquired. The higher the stage moving speed, the larger the amount of shift becomes, thereby causing the problem that the focusing position is not correctly determined. The problem is caused because there occurs a shift from the practical Z coordinate of the image by multiplying the time difference between the acquisition of the image and the acquisition of the Z coordinate of the stage by the stage moving speed.

FIG. 2A is an explanatory view of the shift of the focusing position.

In FIG. 2A, an image is acquired at time t1 (1), and a stage position is acquired at time t2 (2). Then, the stage position acquired at time t2 (2) is entered as the Z position of the image acquired at time t1 (1). Therefore, there occurs a time difference between the Z position at the acquisition of the image and the Z position of the stage at the acquisition of the Z position by the CPU by the time difference between time t2 and the time t1. Since a shift also occurs at the focusing position, the amount of shift from the focusing position is expressed by the following equation 1.

Amount of shift from focusing position
$$\Delta Z(m) = (t2-t1)(s) \times v(m/s) \qquad \text{equation 1}$$

where v indicates the stage moving speed.

By the equation 1 above, the amount of shift from the focusing position becomes larger in proportion to the stage moving speed.

The amount of shift from the focusing position is defined by the equation 1 above for simplicity. However, to be correct, used is the following equation 2 in which a sampling error $\Delta Zsmpl(m)$ is added to the equation 1 above.

Amount of shift from focusing position
$$\Delta Z(m) = (t2-t1)(s) \times v(m/s) + \Delta Zsmpl(m) \qquad \text{equation 2}$$

The sampling error $\Delta Zsmpl(m)$ refers to an amount of shift between the contrast peak position detected from the sampled image and the practical focusing position.

(First Embodiment)

Figure 2B:
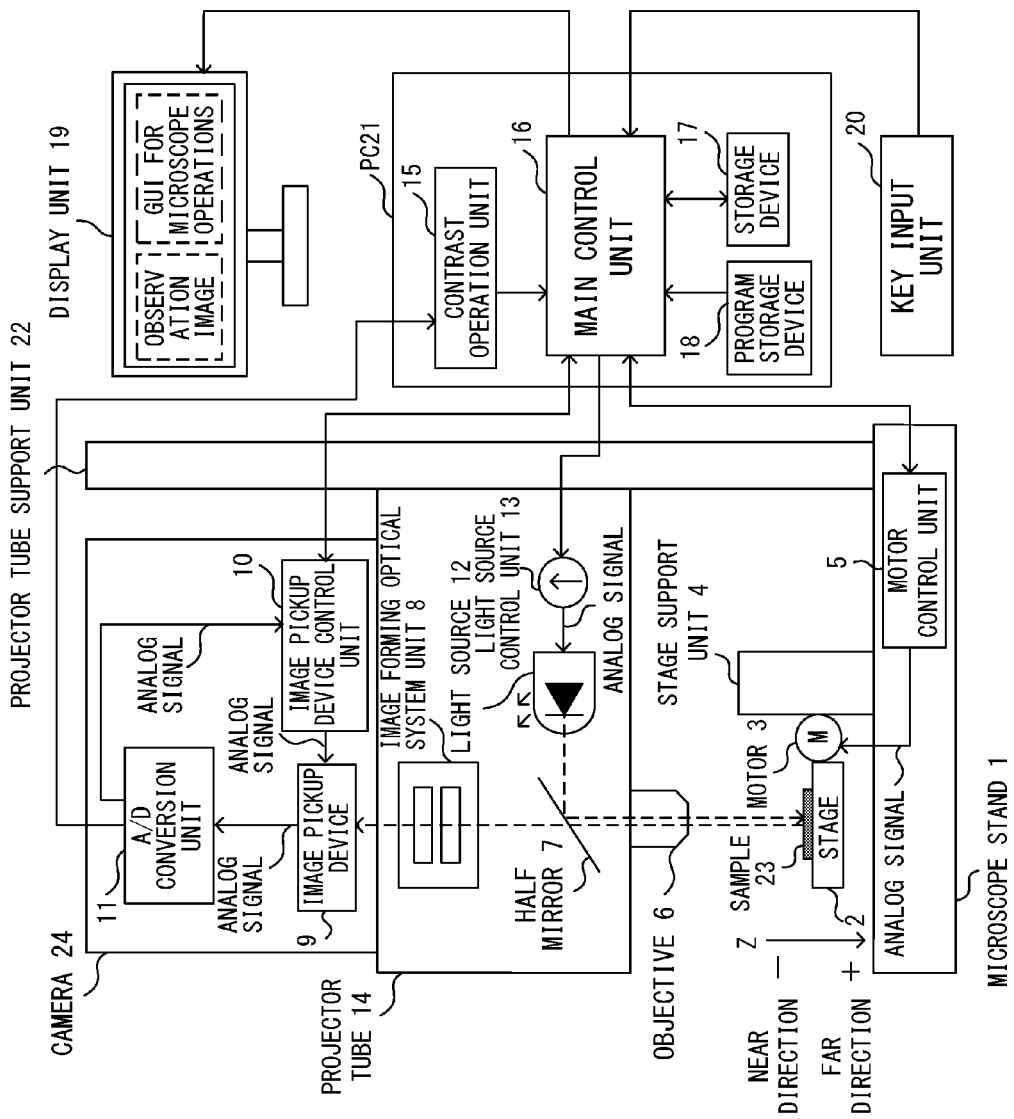
FIG. 2B is an example of a configuration of the microscope system having an AF mechanism according to the first or second embodiment of the present invention.

FIG. 2B is an example of a configuration of the microscope system having an AF mechanism according to the first or second embodiment of the present invention.

In FIG. 2B, the microscope system according to the present invention includes the body of a microscope, a camera 24, a display unit 19 for display of a captured observation image and a GUI for microscope operations, an key input unit 20 such as a keyboard, a mouse, etc. for operation of the GUI for microscope operations displayed on the display unit 19, and a PC 21.

The body of the microscope includes a microscope stand 1, a stage 2 for placing a sample 23 as a subject for use in an observation, a motor 3, a stage support unit 4, a motor control unit 5, an objective 6, a half mirror 7, an image forming optical system unit 8, a light source 12, a light source control unit 13, and a projector tube 14 containing the half mirror 7 through the light source control unit 13.

The camera 24 includes an image pickup device 9, an image pickup device control unit 10 provided with an automatic exposure sensitivity adjusting function, and an A/D conversion unit 11.

The PC 21 includes a contrast operation unit 15, a main control unit 16, a storage device 17, and a program storage device 18 storing an autofocus program for realizing the present invention.

With the configuration, the main control unit 16 transmits an instruction value of an amount of motor drive to the motor control unit 5, and the motor control unit 5 drives the motor 3. By driving the motor 3, the stage 2 moves along the stage support unit 4. The light emitted from the light source 12 illuminates the sample 23 placed on the stage 2 by way of the half mirror 7 and the objective 6. The light reflected by the sample 23 on the stage 2 reaches the image pickup device 9 through the half mirror 7 and the image forming optical system unit 8, and forms an image at the image pickup device 9. The motor control unit 5 is controlled by the program software loaded into the main control unit 16 by the program storage device 18. The contrast operation unit 15 receives a digitally converted image signal through the image pickup device 9 and the A/D conversion unit 11, and inputs an operation result obtained by the contrast operation process to the main control unit 16. The main control unit 16 inputs to the storage device 17 a maximum value as a result of the input contrast operation, and a Z coordinate etc. when the contrast operation indicates the maximum value.

The brightness of the light source 12 may be specified from the GUI for microscope operations on the GUI for microscope operations displayed on the display unit 19, and the main control unit 16 transmits an instruction value to the light source control unit 13 to adjust the brightness of the light source 12.

The image pickup device control unit 10 has the automatic exposure sensitivity adjusting function (hereafter referred to as an AE), controls the frame rate of the image pickup device 9 so that the optimum brightness value of the image captured from the brightness data of the image transmitted from the A/D conversion unit 11 may be acquired, and automatically adjusts the exposure sensitivity of the camera 24. During the AF, the AE is locked so that the exposure sensitivity may be constant.

The microscope system with the above-mentioned configuration performs the autofocus of an observation image which is observed by a microscope.

The camera 24 captures the sample 23 at a specified time interval through the image forming optical system unit 8 while relatively moving the stage 2 loaded with the sample 23 as a subject and the image forming optical system unit 8 of the microscope.

The contrast operation unit 15 calculates the contrast value indicating the level of the contrast of the captured observation image.

The main control unit 16 detects the calculated maximum contrast image having the largest contrast value in the plurality of captured observation images. The main control unit 16 detects the relative positions of the stage 2 and the image forming optical system unit 8. The main control unit 16 further performs the correcting process of moving the detected relative position corresponding to the detected maximum contrast image by a specified value in the direction opposite the direction of the relative movement, and brings the corrected relative position as a focal point.

Next, the flow of the AF processing according to the present invention is described below.

Figure 3:
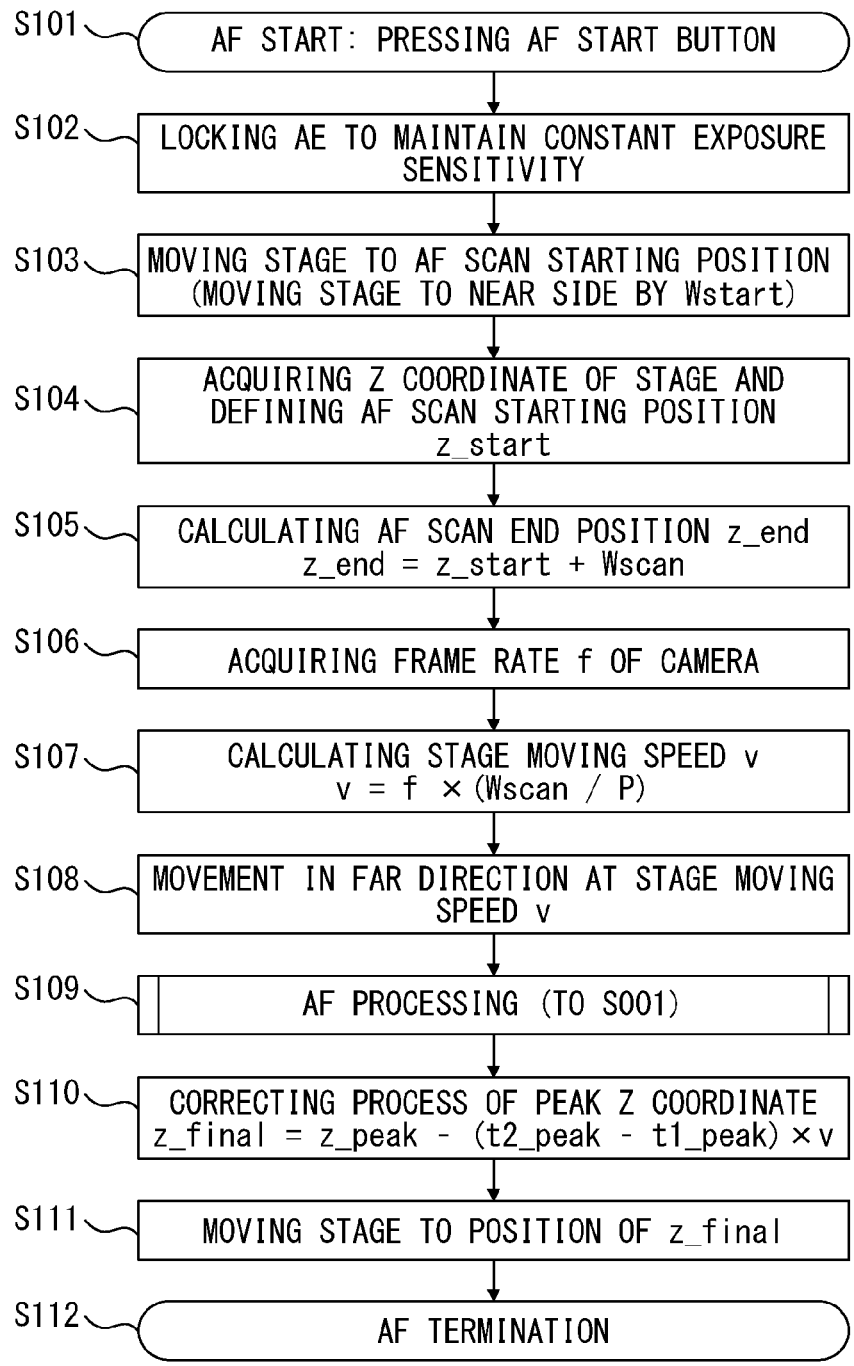
FIG. 3 is a flowchart (1) of the AF processing according to the first embodiment of the present invention.
Figure 4:
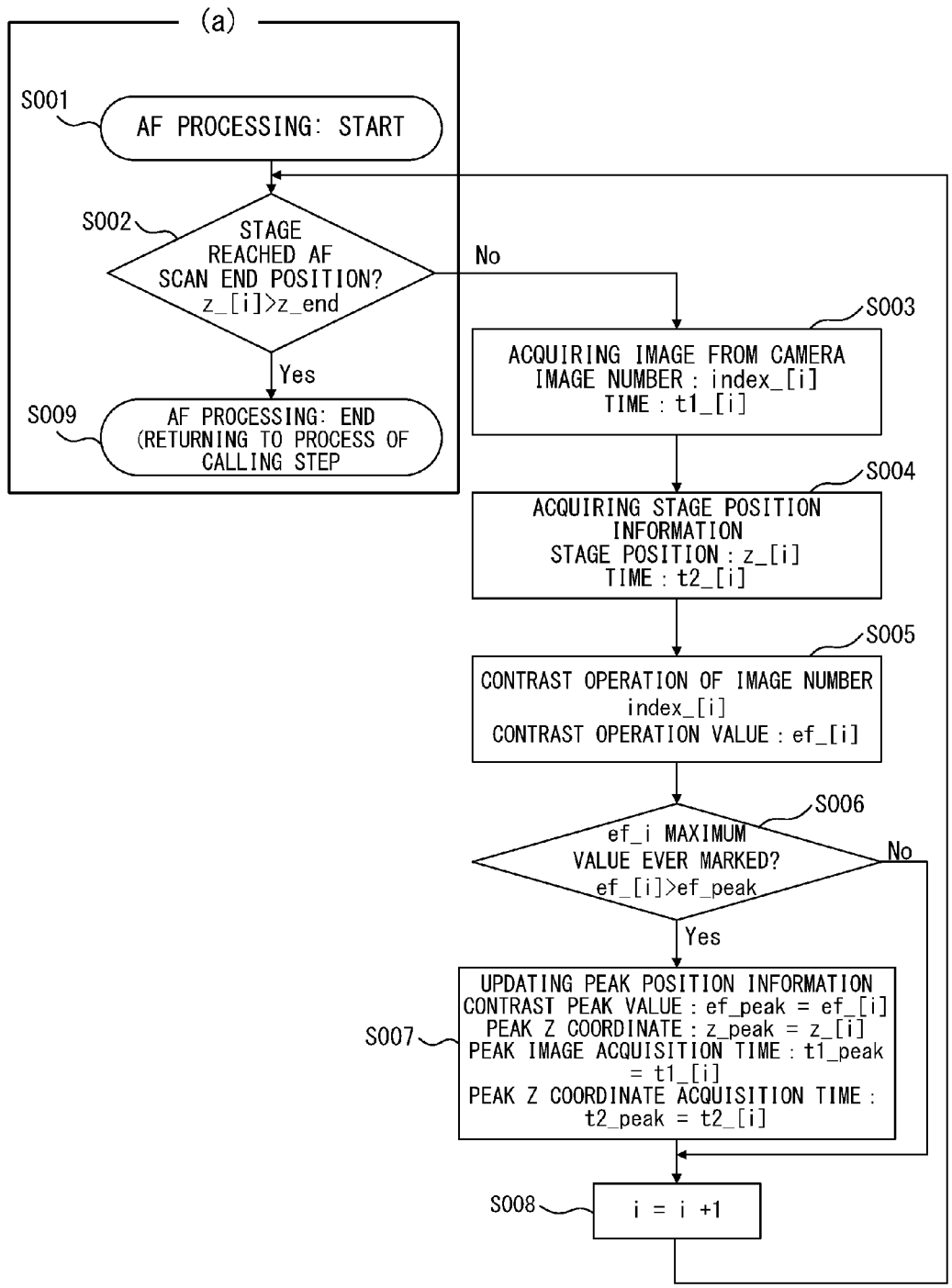
FIG. 4 is a flowchart (2) of the AF processing according to the first embodiment of the present invention.
Figure 5:
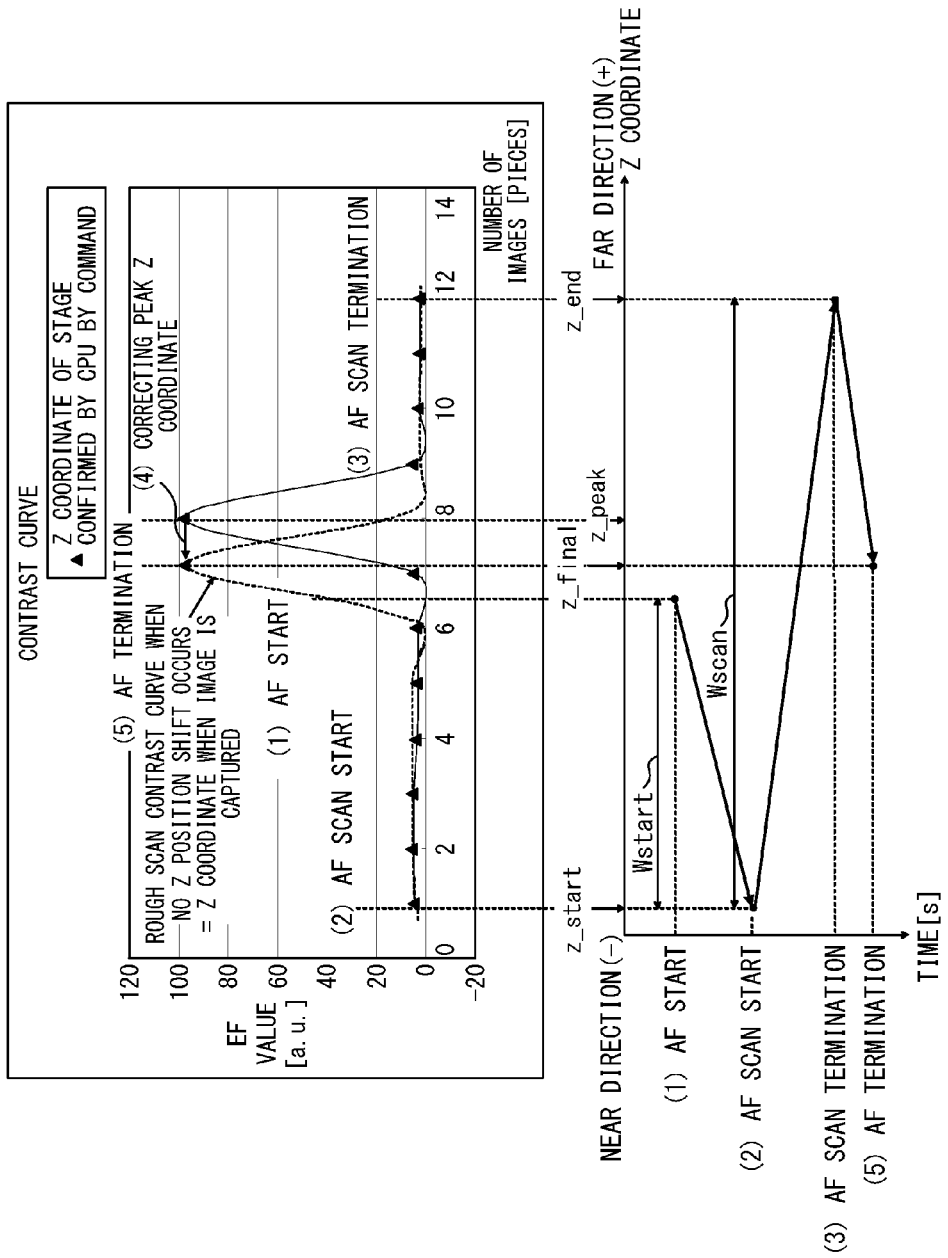
FIG. 5 is an explanatory view of the AF sequence according to the first embodiment of the present invention.

FIGS. 3 and 4 are flowcharts of the AF processing according to the first embodiment of the present invention. FIG. 5 is an explanatory view of the AF sequence according to the first embodiment of the present invention.

First, in step S101 in FIG. 3, the AF start button is pressed on the GUI for microscope operations displayed on the display unit 19 ((1) in FIG. 5). If the AF start button is pressed in step S101, the main control unit 16 transmits an AF start signal to the image pickup device control unit 10 in step S102, and the image pickup device control unit 10 controls the image pickup device 9 so that the exposure sensitivity is kept constant.

After step S102, the stage 2 is moved to the AF scan starting position by a specified value Wstart(m) in step S103 ((1)→(2) in FIG. 5). At this point, the direction of the movement of the stage 2 is the direction (to near side) in which the stage 2 approaches the objective 6.

When the movement of the stage 2 is terminated by the specified value Wstart(m) in step S103, the main control unit 16 transmits the command to confirm the Z coordinate of the current stage 2 to the motor control unit 5 in step S104, acquires the Z coordinate of the stage 2, and stores the coordinate as the AF scan starting position Z_start(m) in the storage device 17.

Next, instep S105, the AF scan end position Z_end(m) is calculated and stored in the storage device 17. The AF scan end position Z_end(m) is the value (Z_end=Z_start+Wscan) obtained by adding the AF scan range Wscan(m) to the AF scan starting position Z_start(m).

Then, after step S105, the main control unit 16 acquires the camera frame rate f (fps) from the image pickup device control unit 10 in step S106, and calculates the stage moving speed v by the following equation 3.

$$\text{Stage moving speed } v(m/s) = f(\text{fps}) \times (W\text{scan}(m)/P) \quad \text{equation 3}$$

where P indicates the number of sampled images, and Wscan/P indicates the distance in one sampling operation by dividing the AF scan range Wscan(m) by the number P of sampled images. The stage moving speed v may be a specified constant speed.

After step S107, the stage 2 is moved in the far direction at the stage moving speed v (m/s) in step S108 ((2) in FIG. 5).

Next, in step S109, the AF processing is performed. The details of the AF processing are described with reference to FIG. 4.

When the AF processing is started in step S001 in FIG. 4, it is determined in step S002 whether or not the stage 2 has reached the AF scan end position.

If it has not reached (NO in step S002), the main control unit 16 operates the image pickup device control unit 10 with the stage 2 moved in step S003, an image is captured at specified interval, and the image is acquired. The acquired image is assigned the image number index_[i], and the time at which the image is acquired is t1_[i], and is stored in the storage device 17.

Next, in step S004, the main control unit 16 transmits a command to confirm the Z coordinate of the current stage 2 to the motor control unit 5, acquires the Z coordinate of the stage 2 as Z_[i], and the time at which the Z coordinate of the stage 2 is acquired is stored as t2_[i] in the storage device 17.

In addition, in step S005, the contrast operation of the image number index_[i] is performed, and the contrast operation value is stored as ef_[i] in the storage device 17.

Then, if ef_[i] is the largest value ever marked (YES in step S006), then the contrast peak value ef_peak, the peak Z coordinate Z_peak(m), the peak image acquisition time t1_peak, and the peak Z coordinate acquisition time t2_peak are updated in step S007, and the index number i is incremented by 1 in step S008. On the other hand, in step S006, if ef_[i] is not the largest value ever marked (NO in step S006), then control is passed to S008.

Afterwards, until it is determined that the AF scan end position has been reached (YES in step S002), the processes in steps S003 through S008 are repeated ((2)→(3) in FIG. 5).

Then, after the AF scan end position has been reached ((3) in FIG. 5), in step S110 in FIG. 3, performed is the correcting process of shifting the peak Z coordinate as follows in the direction opposite the direction of the movement of the stage 2 when the peak Z coordinate is detected, and the corrected peak Z coordinate is set as Z_final(m) by the following equation 4 ((4) in FIG. 5).

$$\text{Peak } Z \text{ coordinate } Z\_\text{final}(m) = Z\_\text{peak}(m) - (t2\_\text{peak} - t1\_\text{peak})(s) \times v(m/s) \quad \text{equation 4}$$

In the equation 4 above, the value (t2_peak−t1_peak) obtained by subtracting the peak image acquisition time t1_peak from the peak Z coordinate acquisition time t2_peak indicates the time difference from the acquisition of the image to the acquisition of the stage position, and the distance from the image acquisition position to the stage position acquisition position is calculated by multiplying the time difference by the stage moving speed v (m/s). Then, by moving the peak Z coordinate Z_peak(m) to the near side by the distance, a correct focusing position may be calculated.

After the process in step S110 is terminated, the stage 2 is moved to Z_final(m) in step S111 ((3)→(5) in FIG. 5), and the process terminates in step S112 ((5) in FIG. 5).

Thus, the shift between the image acquisition position and the stage position may be cleared, thereby correctly determining the focusing position.

(Second Embodiment)

The microscope system according to the second embodiment is similar to the microscope system according to the first embodiment described above with reference to FIG. 2B.

Figure 9:
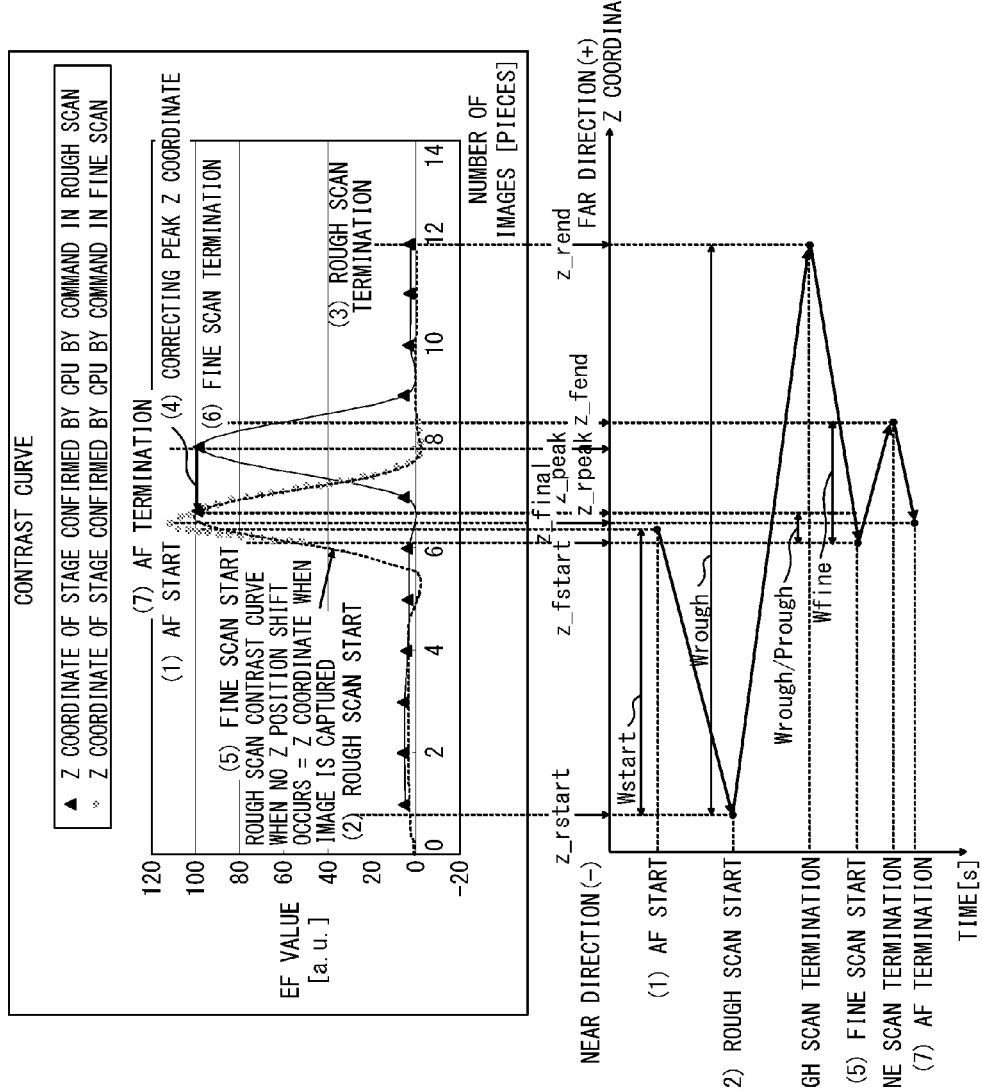
FIG. 9 is an explanatory view of the AF sequence according to the second embodiment of the present invention.

FIGS. 6A, 6B, 7, and 8 are flowcharts of the AF processing according to the second embodiment of the present invention. FIG. 9 is an explanatory view of the AF sequence according to the second embodiment of the present invention.

Figure 6A:
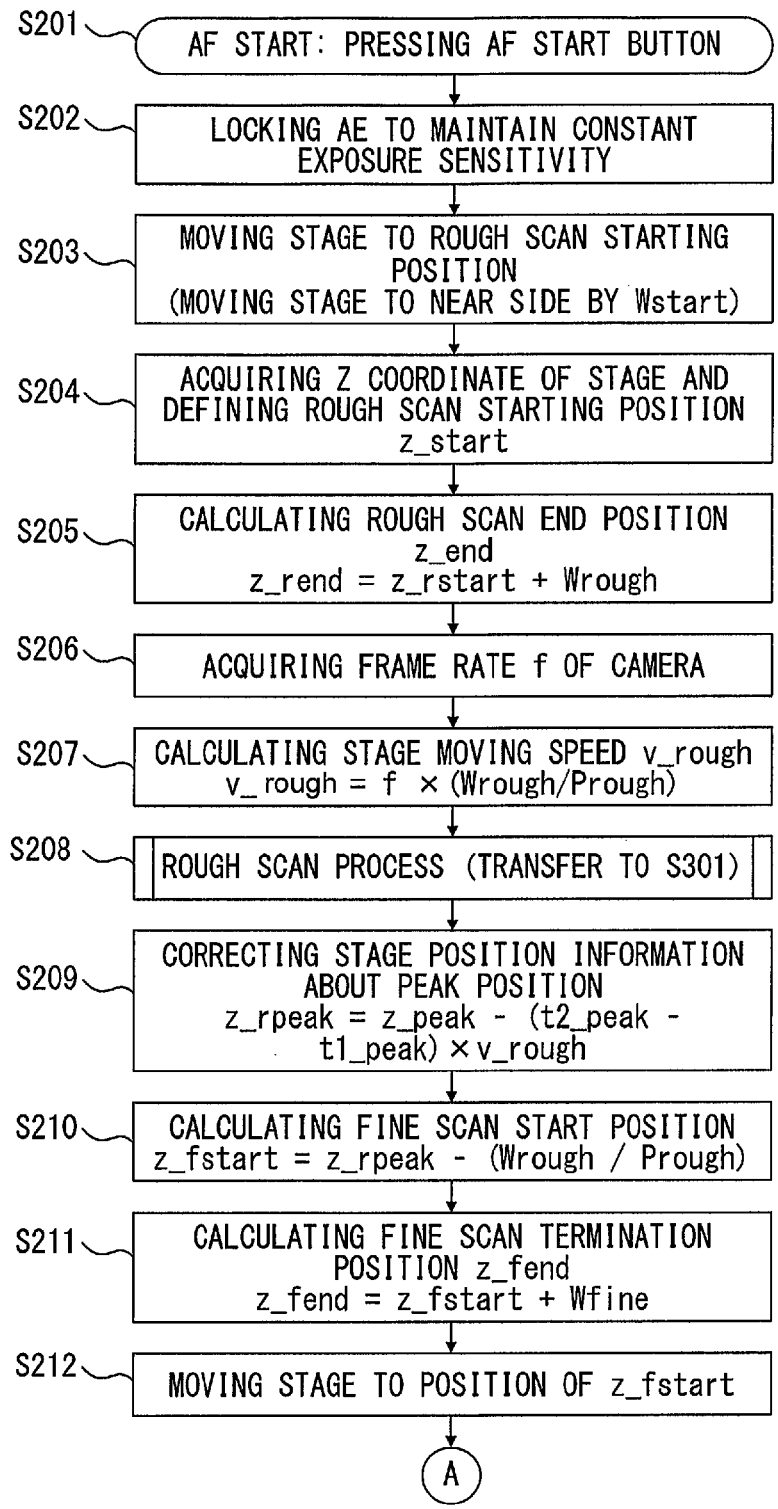
FIGS. 6A and 6B are a flowchart (1) of the AF processing according to the second embodiment of the present invention.

First, in step S201 in FIG. 6A, the AF start button is pressed on the GUI for microscope operations displayed on the display unit 19 ((1) in FIG. 9). If the AF start button is pressed in step S201, the main control unit 16 transmits an AF start signal to the image pickup device control unit 10 in step S202, and the image pickup device control unit 10 controls the image pickup device 9 so that the exposure sensitivity may be constant.

After step S202, the stage 2 is moved to the rough scan starting position by the specified value Wstart(m) in step S203 ((1)→(2) in FIG. 9). At this point, the direction of the movement of the stage 2 is the direction (near direction) in which the stage 2 approaches the objective 6.

If the movement of the stage 2 is terminated by the specified value Wstart(m) in step S203, then the main control unit 16 transmits the command to confirm the Z coordinate of the current stage 2 to the motor control unit 5, acquires the Z coordinate of the stage 2, and stores the coordinates as the rough scan starting position Z_rstart(m) in the storage device 17 in step S204.

Next, in step S205, the rough scan end position Z_rend(m) is calculated and stored in the storage device 17. The rough scan end position Z_rend(m) is a value (Z_rend=Z_rstart+ Wrough) obtained by adding the rough scan range Wrough (m) to the rough scan starting position Z_rstart(m).

Then, in step S206 after step S205, the main control unit 16 acquires the camera frame rate f (fps) from the image pickup device control unit 10, and calculates the stage moving speed v_rough (m/s) by the following equation 5.

$$\text{Stage moving speed } v\_\text{rough}(m/s) = f(\text{fps}) \times (W\text{rough} (m)/P\text{rough}) \quad \text{equation 5}$$

where Prough indicates the number of sampled images in the rough scan, and Wrough/Prough indicates the distance in one sampling operation by dividing the rough scan range Wrough(m) by the number of sampled images Prough.

In step S208 after step S207, the rough scan process is performed. The details of the rough scan process are described below with reference to FIG. 7.

Figure 7:
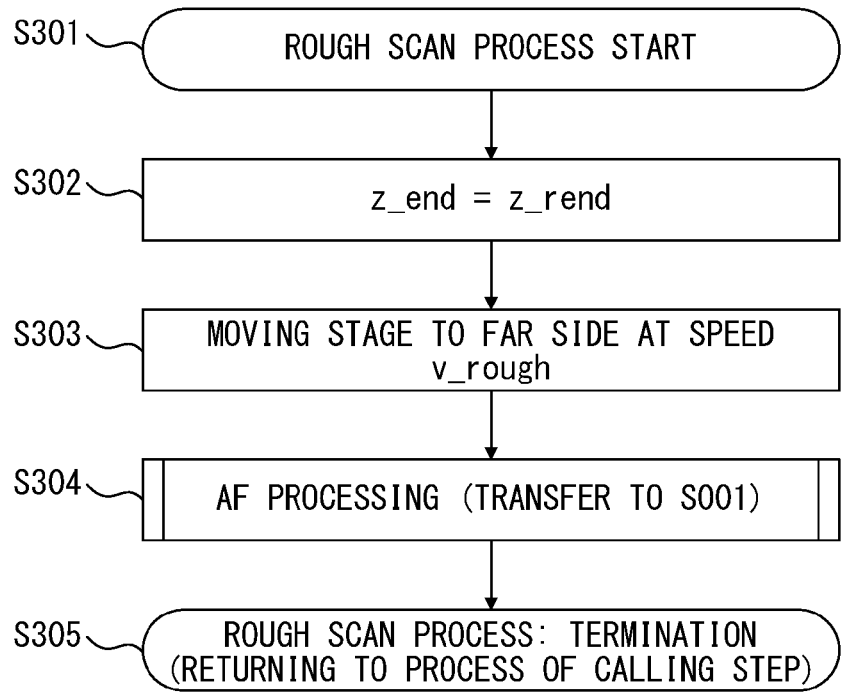
FIG. 7 is a flowchart (2) of the AF processing according to the second embodiment of the present invention.
Figure 8:
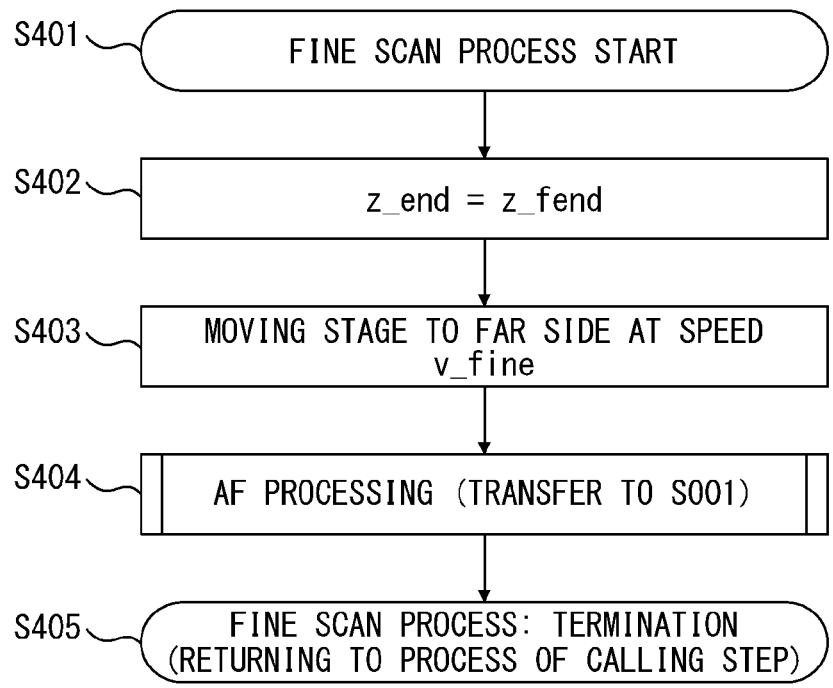
FIG. 8 is a flowchart (3) of the AF processing according to the second embodiment of the present invention.

First, if the rough scan process is started in step S301 in FIG. 7, the value of the rough scan end position Z_rend(m) is copied to the AF scan end position Z_end(m).

Next, in step S303, the stage 2 is moved in the far direction by the stage, moving speed v_rough (m/s) ((2) in FIG. 9), and the AF processing (steps S001 through S009) according to the first embodiment described above with reference to FIG. 7 is performed in step S304 ((2)→(3) in FIG. 9).

Then, after the rough scan end position is reached ((3) in FIG. 9), the rough scan process is terminated in step S305.

Next, in step S209 in FIG. 6A, when the peak Z coordinate is detected, the correcting process of shifting the peak Z coordinate as described below is performed in the direction (near direction in this case) opposite the direction in which the stage 2 is moved when the peak Z coordinate is detected, and the corrected peak Z coordinate is defined as Z_rpeak(m) as expressed by the following equation 6 ((4) in FIG. 9).

$$\text{peak } Z \text{ coordinate } Z\_\text{rpeak}(m) = Z\_\text{peak}(m) - (t2\_\text{peak} - t1\_\text{peak})(s) \times v\_\text{rough } (m/s) \ldots \quad \text{equation 6}$$

In the equation 6 above, the value (t2_peak−t1_peak) obtained by subtracting the peak image acquisition time t1_peak from the peak Z coordinate acquisition time t2_peak indicates the time difference from the acquisition of the image to the acquisition of the stage position, and the distance from the image acquisition position to the stage position acquisition position is calculated by multiplying the time difference value by the stage moving speed v_rough (m/s). Then, by moving the peak Z coordinate Z_rpeak(m) by the distance to the near side, a correct focusing position may be calculated.

After terminating the process in step S209, the fine scan starting position Z_fstart(m) is calculated in step S210. The fine scan starting position starts from the position where the stage 2 is moved by one frame of the rough scan from the rough scan peak position Z_rpeak(m) to the near side. The calculation is made as follows by the equation 7 below.

$$\text{Fine scan starting position } Z\_\text{fstart}(m) = Z\_\text{peak}(m) - (W\text{rough}(m)/P\text{rough}) \quad \text{equation 7}$$

By moving the stage by one frame of the rough scan to the near side, the contrast peak which may have been missed in the frame of the rough scan may be checked in detail in the fine scan.

Then, instep S211 after step S210, the fine scan end position Z_fend(m) is calculated and stored in the storage device 17. The fine scan end position Z_fend(m) is obtained (Z_fend=Z_fstart+Wfine) by adding the fine scan range Wfine(m) to the fine scan starting position Z_fstart(m).

In step S212 after step S211, the stage 2 is moved to the position of Z_fstart(m) ((3)→(5) in FIG. 9).

Then, in step S213, after the arrival at the fine scan starting position, the stage moving speed v_fine (m/s) is calculated by the following equation 8.

$$\text{Stage moving speed } v\_fine(m/s) = f(fps) \times (W fine(m)/P fine) \quad \text{equation 8}$$

where Pfine indicates the number of sampled images in the fine scan, and Wfine/Pfine indicates the distance in one sampling operation by dividing the fine scan range Wfine(m) by the number of sampled images Pfine of the fine scan.

The stage moving speed v_fine (m/s) in the fine scan is lower than the stage moving speed v_rough (m/s) in the rough scan (v_fine<<v_rough) and the image sampling may be performed in more detail in the fine scan than in the rough scan.

In step S214 after step S213, the fine scan process is performed. The fine scan process is described in detail with reference to FIG. 8.

First, when the fine scan process is started in step S401, the value of the fine scan end position Z_fend(m) is copied to the AF scan end position Z_end(m) in step S402.

Next, in step S403, the stage 2 is moved in the far direction at the stage moving speed v_fine (m/s) ((5) in FIG. 9). In step S404, the AF processing (steps S001 through S009 in FIG. 4) according to the first embodiment described above with reference to FIG. 8 is performed ((5)→(6) in FIG. 9).

Then, after the arrival at the fine scan end position ((6) in FIG. 9), the fine scan is terminated in step S405.

Figure 6B:
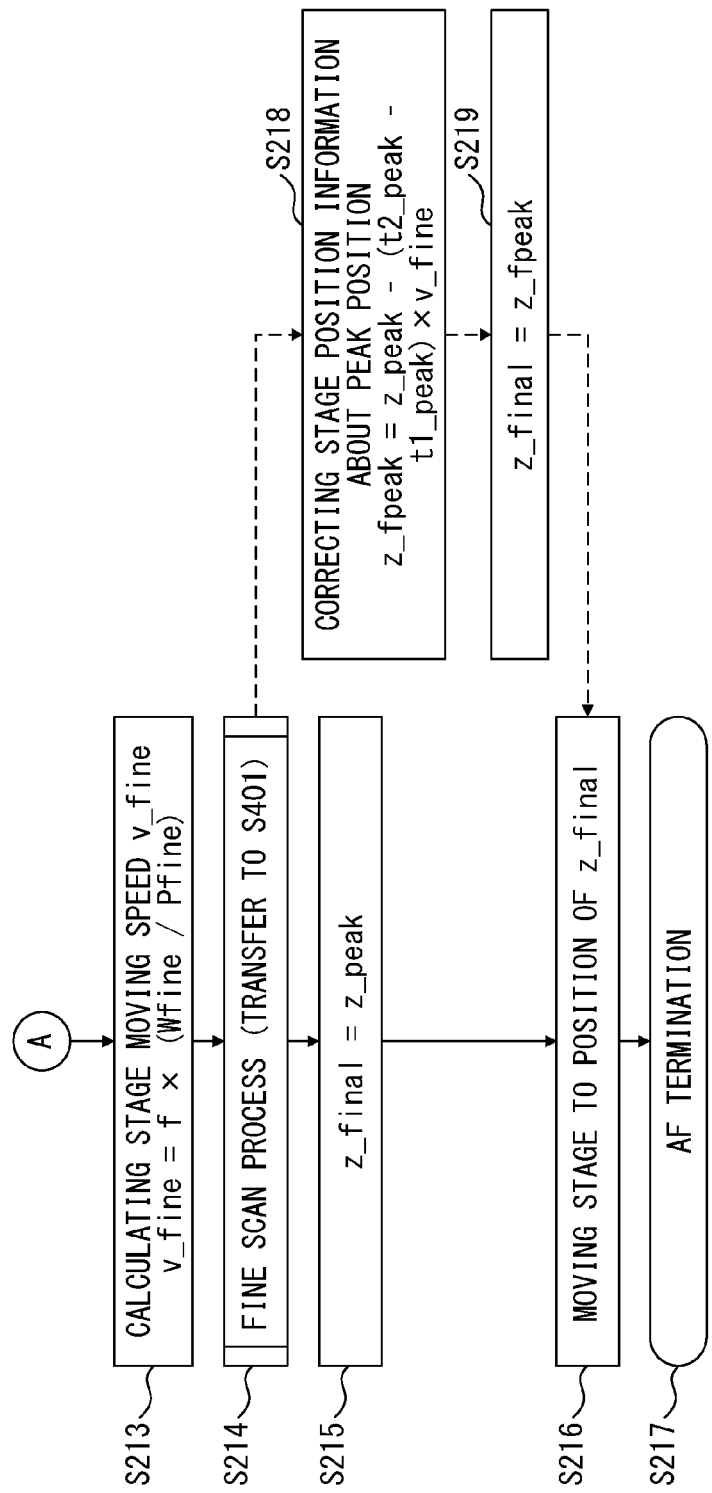

In step S215 in FIG. 6B, the value of the peak Z position Z_peak(m) detected in the fine scan is copied to the final Z position Z_final(m).

Then, after the termination of the process in step S215, the stage 2 is moved to the final Z position Z_final(m) ((6)→(7) in FIG. 9) in step S216, and the AF is terminated at step S217 ((7) in FIG. 9).

Since only one scanning operation is performed in the first embodiment described above, the scan is performed at a lower speed to acquire an image in a wide range. Therefore, the AF time is. long. Therefore, according to the second embodiment, a contrast peak position is detected at a higher speed with higher accuracy than in only one scanning operation by searching for the contrast peak position in detail in the fine scan after roughly searching for the position of the contrast peak in the rough scan.

Furthermore, according to the second embodiment, the contrast peak position detected by the rough scan is corrected, and the position moved from the corrected contrast peak position to the near side by one sampling section of the rough scan is defined as the fine scan starting position, thereby performing, the AF processing of detecting a contrast peak which may have been missed in the rough scan. By adding the process of determining the fine scan position, a true contrast peak may be correctly detected in a short time.

(Variation Example 1 According to the Second Embodiment)

Described next is the variation example 1 according to the second embodiment.

The present variation example is to add the processes in steps S218 and S219 described later after the completion of the fine scan process in step S214 in FIG. 6B used for explanation of the second embodiment described above. In the fine scan according to the second embodiment, since the stage 2 is moved more slowly than in the rough scan, there is a very small shift between the stage position at the acquisition of an image and the stage position at the acquisition of the Z coordinate. However, by adding the processes in steps S218 and S219, the focusing position may be determined with higher accuracy.

That is, in step S218 after the termination of the fine scan process in step S214, performed as follows is the correcting process of shifting the peak Z coordinate to the direction (near direction in this case) opposite the direction in which the stage 2 is moved when the peak Z coordinate is detected ((4) in FIG. 9).

$$\text{peak } Z \text{ coordinate } Z\_fpeak(m) = Z\_peak(m) - (t2\_peak - t1\ peak)(s) \times vfine(m/s) \quad \text{equation 9}$$

In the equation 9 above, the value (t2_peak−t1_peak) obtained by subtracting the peak image acquisition time t1_peak from the peak Z coordinate acquisition time t2_peak indicates the time difference between the acquisition of the image and the acquisition of the stage position, and the distance from the image acquisition position to the stage position acquisition position is calculated by multiplying the time difference by the stage moving speed v_fine (m/s). Then, a correct focusing position may be calculated by moving the peak Z coordinate Z_peak(m) to the near side by the distance.

Then, in step S219 after the termination of the process in step S218, the corrected value of the peak Z position Z_fpeak (m) is copied to the final Z position Z_final(m).

In step S216 after step S219, as in the second embodiment, the stage 2 is moved to the position of Z_final(m) ((6)→(7) in FIG. 9), thereby terminating the AF in step S217 ((7) in FIG. 9).

(Variation Example 2 According to the Second Embodiment)

Described next is the variation example 2 according to the second embodiment.

In the AF processing (step S404 in FIG. 8) performed during the fine scan process in step S214 according to the second embodiment described above, the AF processing may be performed with the stage 2 moved by the pitch as in the technology distance in the patent document 1. That is, the AF operation is performed by transferring the stage 2 to the far side at the stage moving speed v_fine (m/s), temporarily stopping the stage 2 when an image is shot, and acquiring the stage position after receiving a capture signal.

The first and second embodiments are described above. In the above-mentioned first and second embodiments, the configuration and the AF operation of a microscope system may be changed as in the following other variation examples 1 through 5. The variation examples 1 through 5 may be realized by combining more than one of them, and the above-mentioned first and second embodiment, and the variation examples 1 and 2 of the second embodiment may be combined.

(Another Variation Example 1)

FIG. 10 is an example of a configuration of the microscope system having an AF mechanism according to another variation example 1 of the present invention.

The microscope system illustrated in FIG. 10 is a microscope system applied when, for example, a transparent living sample is observed. It is different in the configuration of the body of the microscope from the microscope system according to the first or second embodiment as illustrated in FIG. 2B. That is, the light source 12 is positioned under the stage 2, and light passes through the hole at the center of the stage 2, which means an inverted microscope.

(Another Variation Example 2)

Figure 11:
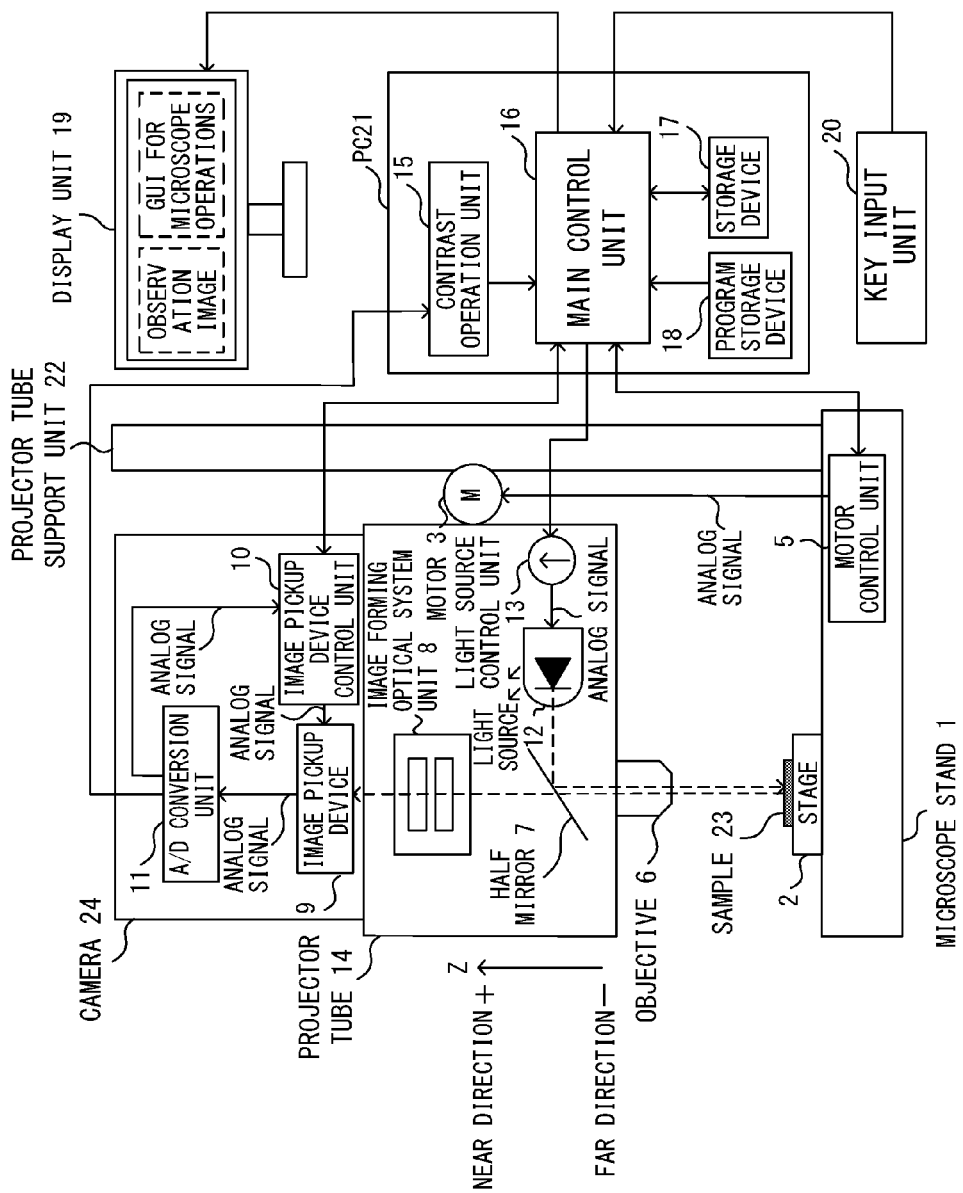
FIG. 11 is an example of a configuration of the microscope system having an AF mechanism according to another variation example 2 of the present invention.

FIG. 11 is a configuration example of the microscope system having the AF mechanism of another variation example 2 of the present invention.

The microscope system illustrated in FIG. 11 is different in the configuration of the body of the microscope from the microscope system of the first or second embodiment. That is, when the AF is performed, the projector tube 14, not the stage 2, is moved along a projector tube support unit 22 by driving the motor 3. When the projector tube 14 is moved, it is defined that the direction in which the objective 6 approaches the stage 2 is the near direction, and the direction in which the objective 6 moves away from the stage 2 is the far direction.

(Another Variation Example 3)

The following constant may have a different value for each magnification of the objective 6. In addition, when an optical zoom mechanism is provided for the structure of the projector tube 14 and the camera 24, a different value may be assigned depending on the total magnification obtained by multiplying the magnification of the objective 6 by the magnification of the optical zoom. If the different values are assigned, a value may be read from the storage device 17 depending on the magnification of the objective 6 or the total magnification.

Constant Wstart(m): Wstart(m) refers to a specified amount of movement to an AF scan starting position or rough scan starting position marked when the AF is started. The objective 6 has a different work distance (WD) for each magnification, and the higher the magnification of the objective 6, the shorter the WD becomes. Therefore, if the Wstart (m) is a large value regardless of the objective 6, the sample 23 and the objective 6 may clash into each other when the objective 6 has a high magnification. To avoid this, the value of the Wstart(m) is different for each objective 6.

Constants Wscan (m), Wrough (m), Wfine (m): The constants indicate the scanning range for performing the AF. The range of the focal depth depends on whether the magnification of the objective 6 or the integrated magnification is low or high. The higher the magnification, the shorter the focal depth becomes. On the other hand, the lower the magnification, the higher the focal depth becomes. If the AF scan range is specified for any magnification, for example, when the AF is performed with a low magnification, there is a possibility that the focusing position is not reached due to a too small AF scan range. To solve the problem, the values of Wscan(m), Wrough (m), and Wfine(m) may be appropriately changed.

Constants P, Prough, Pfine: The constants indicate the number of sampled images. The larger the value, the more images are sampled in the AF scan, thereby improving the accuracy in detecting the contrast peak position. On the other hand, since the stage 2 moves slowly, the AF time is longer. Depending on the magnification of the objective 6 and the integrated magnification, the value of the focal depth is determined, and the higher the magnification, the smaller the focal depth becomes, and the lower the magnification, the larger the focal depth becomes. Therefore, the number of sampled images is to be large with a high magnification, and the sampling interval of images is to be short. Otherwise, it is difficult to detect a contrast peak position. On the other hand, if the number of sampled images is large, the AF time becomes long. To solve the problem, the number of sampled images is varied depending on the magnification.

(Another Variation Example 4)

The near direction and the far direction may be opposite to each other. When the AF is performed by moving the stage 2, the direction in which the objective 6 is approached is the far side, and the direction in which the objective 6 becomes farther is the near side. On the other hand, when the AF is performed by moving the projector tube 14, the direction in which the stage 2 is approached is the far side, and the direction in which the stage 2 becomes farther is the near side.

(Another Variation Example 5)

Figure 12:
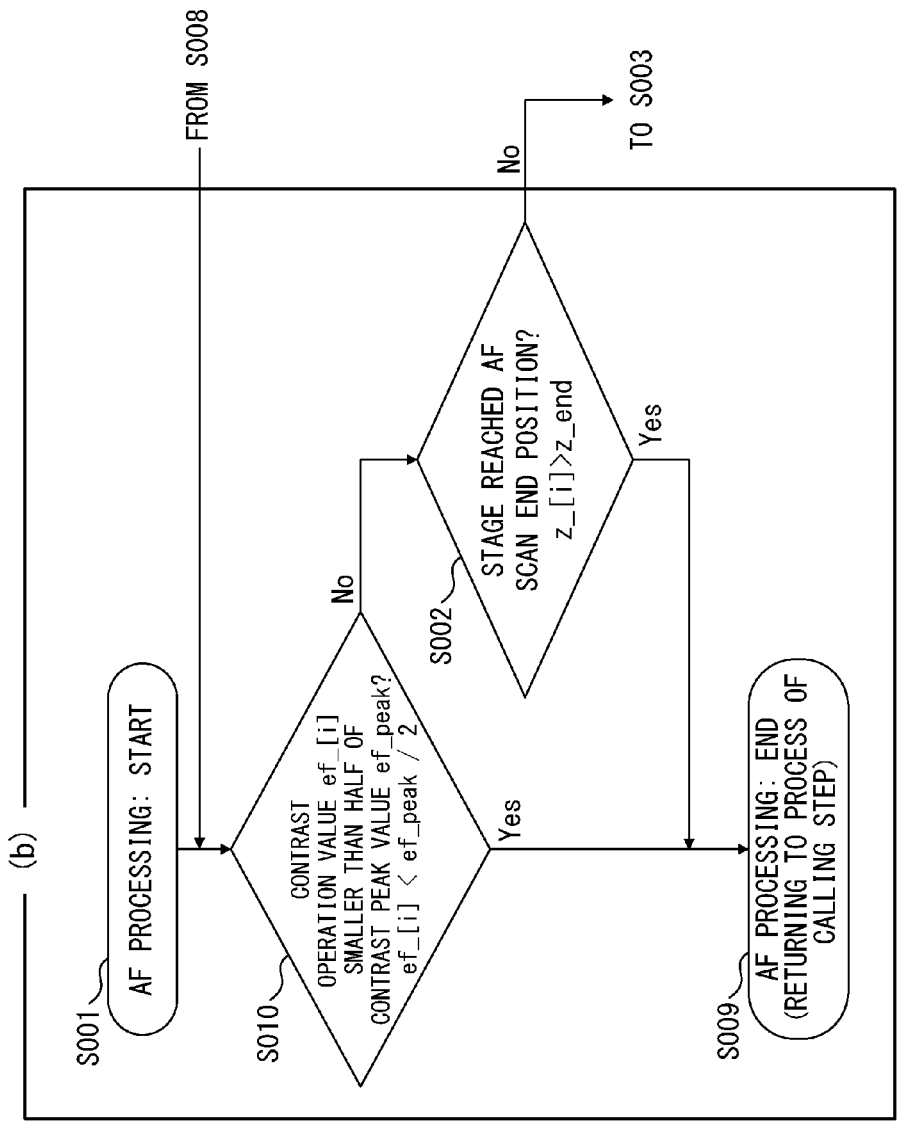
FIG. 12 is a flowchart of the AF processing according to another variation example 5 of the present invention.

FIG. 12 is a flowchart of the AF processing by another variation example 5 of the present invention.

The termination decision of the AF processing may be changed by replacing the process in the range enclosed by (a) in FIG. 4 with (b) in FIG. 12. By changing into the process in FIG. 12, the AF may be terminated without sampling the images up to the end of the AF search range, thereby shortening the AF time.

Concretely, the following process is performed.

That is, after the process in step S008 in FIG. 4, it is determined in step S010 whether or not the contrast operation value ef_[i] is smaller than a half of the contrast peak value ef_peak. If the determination is true (YES in step S010), then the AF processing is terminated and control is returned to the calling step in step S009. On the other hand, if the determination is false (NO in step S010), control is passed to step S002. The processes in and after step S002 are the same as those in FIG. 4.

Each embodiment of the present invention is described above, but the present invention is not limited to each of the embodiments described above, and may be in various configurations or shapes within the gist of the present invention.

The constants used in each of the above-mentioned embodiments such as Z_start, Z_rstart, Z_fstart, Z_end, $Z_{13}$ rend, Z_fend, I, ef_peak, Z_peak, Z_rpeak, Z_fpeak, Z_final, t1_peak, t2_peak, index_[i], t1_[i], t2_[i], ef_[i], v, v_rough, v_fine, f, etc. are all initialized to 0 (zero) if the PC 21 is powered up and the program storage device 18 is operated, and all values stored before are cleared.

According to the present invention, the Z coordinate at the acquisition of an image may be correctly determined, and the focusing position may be correctly determined.

What is claimed is:

1. A microscope system comprising:
   a CPU which is programmed to perform functions including:
   capturing a plurality of observation images including a subject through an optical image forming system while relatively moving one of a stage loaded with the subject and the optical image forming system with respect to the other one of the stage and the optical image forming system;
   calculating a contrast value indicating a contrast level of each of the plurality of captured observation images;
   detecting a maximum contrast image whose calculated contrast value is maximum among the plurality of captured observation images;
   detecting a relative position of the stage and the optical image forming system;
   performing a correcting process of moving the one of the stage and the optical image forming system from the detected relative position corresponding to the detected maximum contrast image by a distance difference based on a time difference between capturing of one of the plurality of observation images and acquisition of the corresponding relative position of the stage and the optical image forming system in a direction opposite a direction of the relative movement of the one of the stage and the optical image forming system; and
   determining a focusing position using the corrected relative position and moving the one of the stage and the optical image forming system to the focusing position.

2. The microscope system according to claim 1, wherein the CPU is further programmed to:
   calculate a relative speed of the one of the stage and the optical image forming system,
   wherein the correcting process includes moving the one of the stage and the optical image forming system from the detected relative position corresponding to the detected maximum contrast image by a value obtained by multiplying (i) the time difference between capturing of one of the plurality of observation images and acquisition of the corresponding relative position of the stage and the optical image forming system and (ii) the relative speed of the one of the stage and the optical image forming system.

3. The microscope system according to claim 1, wherein:
capturing the plurality of observation images includes capturing a plurality of first observation images at a first time interval during a rough scan and capturing a plurality of second observation images at a second time interval during a fine scan; and
detecting the maximum contrast image includes detecting a first maximum contrast image from among the plurality of first observation images captured during the rough scan, and detecting a second maximum contrast image from among the plurality of second observation images captured during the fine scan in a specified range including the detected relative position corresponding to the detected first maximum contrast image.

4. A non-transitory computer-readable storage medium having stored thereon a program that is executable by a computer of a microscope system that performs autofocusing, the program being executable by the computer to perform functions comprising:
capturing a plurality of observation images including a subject through an optical image forming system while relatively moving one of a stage loaded with the subject and the optical image forming system with respect to the other one of the stage and the optical image forming system;
calculating a contrast value indicating a contrast level of each of the plurality of captured observation images;
detecting a maximum contrast image whose calculated contrast value is maximum among the plurality of captured observation images;
detecting a relative position of the stage and the optical image forming system;
performing a correcting process of moving the one of the stage and the optical image forming system from the detected relative position corresponding to the detected maximum contrast image by a distance difference based on a time difference between capturing of one of the plurality of observation images and acquisition of the corresponding relative position of the stage and the optical image forming system in a direction opposite a direction of the relative movement of the one of the stage and the optical image forming system; and
determining a focus position using the corrected relative position and moving the one of the stage and the optical image forming system to the focusing position.

5. The non-transitory computer-readable storage medium according to claim 4, said program causing the computer to further execute:
calculating a relative speed of one of the stage and the optical image forming system,
wherein the correcting process includes moving the one of the stage and the optical image forming system from the detected relative position corresponding to the detected maximum contrast image by a value obtained by multiplying (i) the time difference between capturing of one of the plurality of observation images and acquisition of the corresponding relative position of the stage and the optical image forming system and (ii) the relative speed of the one of the stage and the optical image forming system.

6. The non-transitory computer-readable storage medium according to claim 4, wherein:
capturing the plurality of observation images includes capturing a plurality of first observation images at a first time interval during a rough scan and capturing a plurality of second observation images at a second time interval during a fine scan; and
detecting the maximum contrast image includes detecting a first maximum contrast image from among the plurality of first observation images captured during the rough scan, and detecting a second maximum contrast image from among the plurality of second observation images captured during the fine scan in a specified range including the detected relative position corresponding to the detected first maximum contrast image.

7. An autofocus method for directing a processor of a microscope system to perform autofocusing, the autofocus method comprising:
capturing a plurality of observation images including a subject through an optical image forming system while relatively moving one of a stage loaded with the subject and the optical image forming system with respect to the other one of the stage and the optical image forming system;
calculating a contrast value indicating a contrast level of each of the plurality of captured observation images;
detecting a maximum contrast image whose calculated contrast value is maximum among the plurality of captured observation images;
detecting a relative position of the stage and the optical image forming system;
performing a correcting process of moving the one of the stage and optical image forming system from the detected relative position corresponding to the detected maximum contrast image by a distance difference based on a time difference between capturing of one of the plurality of observation images and acquisition of the corresponding relative position of the stage and the optical image forming system in a direction opposite a direction of the relative movement of the one of the stage and optical image forming system; and
determining a focusing position using the corrected relative position and moving the one of the stage and the optical image forming system to the focusing position.

8. A microscope system comprising:
image pickup means which captures a plurality of observation images including a subject through an optical image forming system while relatively moving one of a stage loaded with the subject and the optical image forming system with respect to the other one of the stage and the optical image forming system;
contrast value calculation means which calculates a contrast value indicating a contrast level of each of the plurality of captured observation images;
maximum contrast image detection means which detects a maximum contrast image whose calculated contrast value is maximum among the plurality of captured observation images;
relative position detection means which detects a relative position of the stage and the optical image forming system;
position correction means which performs a correcting process of moving the one of the stage and the optical image forming system from the detected relative position corresponding to the detected maximum contrast image by a distance difference based on a time difference between capturing of one of the plurality of observation images and acquisition of the corresponding relative position of the stage and the optical image forming system in a direction opposite a direction of the relative movement of the one of the stage and the optical image forming system; and autofocus means which determines a focusing position using the corrected relative position and moves the one of the stage and the optical image forming system to the focusing position.

9. The microscope system according to claim 3, wherein the correcting process includes moving the one of the stage and the optical image forming system from the detected relative position corresponding to the detected first maximum contrast image detected during the rough scan by a distance difference based on a time difference between capturing of one of the plurality of first observation images and acquisition of the corresponding relative position of the stage and the optical image forming system in the direction opposite the direction of the relative movement of the one of the stage and the optical image forming system.

10. The microscope system according to claim 9, wherein capturing the plurality of second observation images during the fine scan starts at a fine scan capture starting position calculated based on the corrected relative position corresponding to the first maximum contrast image detected during the rough scan.

11. The system according to claim 3, wherein a relative speed of the one of the stage and the optical image forming system during the fine scan is slower than the relative speed during the rough scan.

* * * * *